United States Patent [19]
Niv

[11] Patent Number: 5,983,944
[45] Date of Patent: Nov. 16, 1999

[54] APPARATUS FOR ACTIVE FLUID CONTROL

[76] Inventor: Shaul E. Niv, 10 Emeq-Israel, Kiriat Ono, Israel, 55026

[21] Appl. No.: 09/045,220

[22] Filed: Mar. 20, 1998

[51] Int. Cl.$^6$ .................................................. B64C 21/00
[52] U.S. Cl. ........................... 137/831; 137/833; 244/204
[58] Field of Search ................................... 137/831, 833, 137/803; 244/204

[56] References Cited

U.S. PATENT DOCUMENTS

| | | | |
|---|---|---|---|
| 3,747,644 | 7/1973 | Tompsett | 137/831 |
| 3,771,567 | 11/1973 | Linden | 137/831 |
| 4,257,224 | 3/1981 | Wygnanski et al. | 60/204 |
| 4,498,851 | 2/1985 | Kolm et al. | 417/322 |
| 4,595,338 | 6/1986 | Kolm et al. | 416/81 |
| 4,780,062 | 10/1988 | Yamada et al. | 417/322 |
| 4,923,000 | 5/1990 | Nelson | 165/122 |
| 5,040,560 | 8/1991 | Glezer et al. | 137/13 |
| 5,209,438 | 5/1993 | Wygnanski | 244/204 |
| 5,365,490 | 11/1994 | Katz | 244/204 |
| 5,588,466 | 12/1996 | Benz et al. | 137/831 |
| 5,595,205 | 1/1997 | Sirovitch | 137/831 |
| 5,798,465 | 8/1998 | Ziada et al. | 244/204 |

*Primary Examiner*—A. Michael Chambers
*Attorney, Agent, or Firm*—Benman & Collins

[57] ABSTRACT

An apparatus is described for producing fluidic jet perturbations for controlling a fluid stream and mix of fluids. The invention is especially applicable to aerodynamic bodies for delaying separation and increasing the maximum angle of attack. The teachings of the invention can easily be converted to produce mechanic or mechanical fluidic effects. The apparatus provides simultaneous perturbations applicable for successive perturbations in the longitudinal direction as well as for segmented requirements. However, the invention may be advantageously used in other applications, such as increasing the angle of divergence in diffusers, controlling and increasing the mixing rate of fluids in the mixing process without adding any mass, and vectoring fluid streams. It can also be applied, among others uses, for a windshield defogger or a vortex generator.

24 Claims, 12 Drawing Sheets

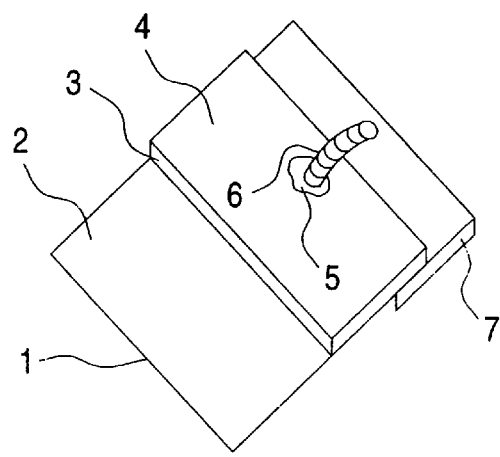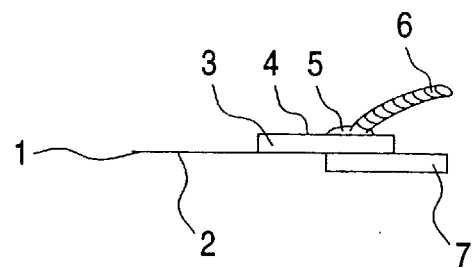
FIG.1a
FIG.1b
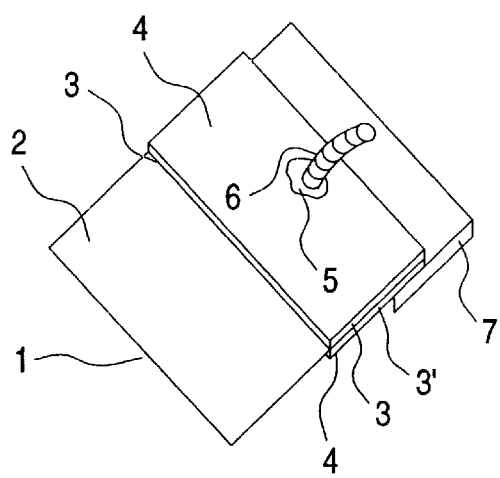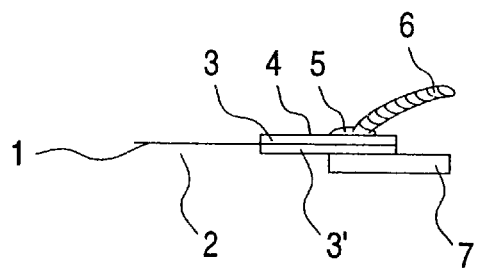
FIG.2a
FIG.2b

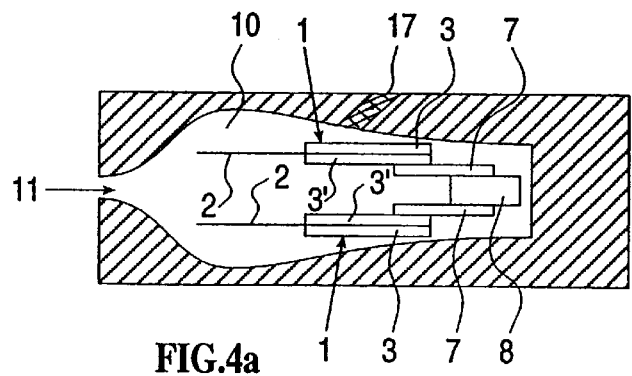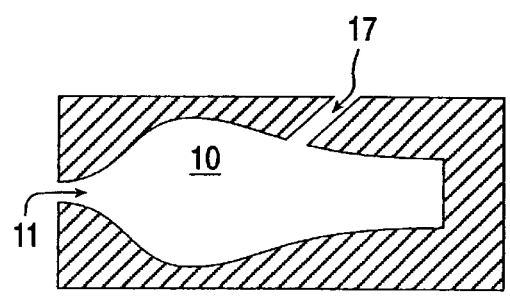
FIG.4a  FIG.4b
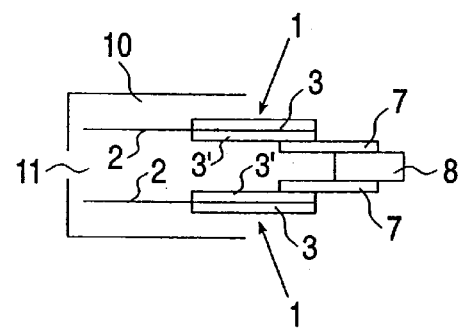
FIG.5

APPARATUS FOR ACTIVE FLUID CONTROL

TECHNICAL FIELD

The present invention relates to an apparatus for fluids control and fluids mixing using an array of piezoelectric ceramic actuators.

BACKGROUND ART

Under certain conditions, wall-bounded flows separate. At separation, the viscous layer departs or breaks away from the bounding surface. The surface streamline nearest to the wall leaves the body at this point; the rotational flow region next to the wall abruptly thickens. The normal velocity component increases, and the boundary layer separates. Due to large energy losses associated with boundary layer separation, the performance of many practical devices is often controlled by the separation location.

For example, the loss of lift, commonly referred to in the literature as "stall", results from the separation of the boundary layer in the airstream flowing over the wing as a result of an adverse pressure gradient which cannot be negotiated by the boundary layer. Such a separation is induced by an increase in the angle of attack of the wing above a predetermined maximum, and limits the maximum lift of a wing of given dimensions.

A similar separation of the boundary layer occurs in diffusers having an enlargement for slowing the fluid flow and recovering pressure. Thus, the angle of the diffuser surface at the enlargement is limited, typically to a 60-degree equivalent angle, in order to prevent separation of the boundary layer.

On the other hand, if separation is postponed, the pressure drag of a bluff body is decreased, the circulation and hence the lift of an airfoil at high angle of attack is enhanced, and the pressure recovery of a diffuser is improved. Separation control is of immense importance to the performance of air, land or sea vehicle, turbomachines, diffusers and variety of other technologically important systems involving fluid flow and fluid mixing.

Apparatus for delaying the separation of flow from a solid surface (such as a wing) has been disclosed; see, e.g., Israel Wygnanski et al, "Method and Apparatus for Controlling the Mixing of Two Fluids", U.S. Pat. No. 4,257,224, issued Mar. 24, 1981, and Israel Wygnansid "Method and Apparatus for Delaying the Separation of Flow from a Solid Surface", U.S. Pat. No. 5,209,438, issued May 11, 1993. The perturbation-producing elements in both of these patents are of mechanical interference, with the flow field or induced oscillations by periodically injecting a fluid jet via a rotating nozzle. Further, the perturbations induced in the flow are predetermined directed.

Substantial alteration of the flow conditions in a fluid stream may be effected by the application of controlled disturbances to the boundary of or within the stream by one or more piezoelectric actuators; see, e.g., Ari Glezer et al, "Method and Apparatus for Controlled Modification of Fluid Flow", U.S. Pat. No. 5,040,560, issued Aug. 20, 1991, and Michael Amitay et al, "Aerodynamic Flow Control Using Synthetic Jet Technology", 36$^{th}$ Aerospace Sciences Meeting & Exhibit (Reno, Nev.), Jan. 12–15, 1998 (AIAA 98-0208).

Apparatus for producing either fluid perturbations with zero net mass-flux or simultaneous perturbation and constant flow is needed. Such apparatus would be useful for controlling the separation of a boundary layer of a fluid stream flowing over a solid surface.

It is therefor an object of this invention to provide a new simple and efficient fluid control apparatus. The output of the apparatus is an oscillating air stream derived by a configuration of piezoelectric elements confined in a resonance cavity. The piezoelectric elements can be driven to produce an output jet at a predetermined frequency or an output jet perturbation at different frequencies band sensed by a detector or programmed in advance. The apparatus of the present invention is to be distinguished from the possible perturbation-producing elements described in Wygnanski et al and in Wygnanski, both cited above. The perturbation producing elements in both of those patents are of mechanical interference with the flow field or induced oscillations by periodically injecting a fluid jet via a rotating nozzle. In contrast, the present invention apparatus provides zero net mass flux jets.

Another difference is that the perturbations induced in the flow of the above-mentioned Wygnanski patents are predetermined directed (see also the Glezer et al and Amitay et al references cited above), whereas in the present invention, the direction of the induced perturbation can be electrically controlled without any geometrical or mechanical changes. In addition, no physical change is needed for the jet output nozzle or the shape of the surface on which the flow is being controlled or the jet perturbations apparatus positioned underneath the surface. The perturbations in the above-mentioned patents to Wygnanski et al and Wygnanski are two-dimensional (2-D) without any possibility for longitudinal modulation, nor even staggered activation.

In the present invention, the shape of the 2-D disturbance jet can be easily modified to 3-D, thereby allowing longitudinal modulation in the frequency, amplitude and phase sense. The present invention allows control of unlimited and different phase lag between unlimited and different longitudinal sections. The present invention also allows control of the perturbation frequency as a 2-D perturbation or 3-D for different longitudinal sections. In the present invention, the controlling features, namely, the frequency changing and the longitudinal modulation of phase and amplitude can be easily achieved electrically.

The apparatus of the present invention is also to be distinguished from previously-known techniques, such as those disclosed by Glezer et al and Amitay et al, which aim to create a "synthetic jet" by driving one side of a cavity using a piston or a piezoelectric diaphragm in a periodic manner. Those techniques suffer from poor frequency response band. Eventually, they have only one discrete resonance frequency. Modulation of the input feeding power (pulsed modulation excitation) accomplished by transient response time causes limitation for modulation at higher frequencies, while the modulated input feeding causes a modulated output signal with higher harmonics. In the present invention, there is no need for modulated input while the output is a pure frequency controllable perturbation jet. Another disadvantage of the previous techniques is geometrical length limitation, while the present invention allows infinite length.

DISCLOSURE OF INVENTION

The present invention relates to an apparatus for producing fluid perturbation with zero net mass-flux or simultaneous perturbation and constant flow, in another operating mode. A broad object of the present invention is to provide an apparatus for controlling the separation of a boundary layer of a fluid stream flowing over a solid surface. The invention provides an active apparatus for producing fluid control jet to replace the old separation control techniques without the complexity penalties associated with mechanical vibrating elements, such as vibrating wires, ribbons, flaps, compressors and rotating valves. The invention conserve costly materials and weight, offering higher characters and efficiency. Only electrical power need to be supplied to the apparatus, and the total energy required to operate the apparatus is very small—distinct from previously-known apparatus of fluid control, which suffer from low efficiency.

The kernel problem in separation control, discussed above, is to add momentum to the very near wall region of the flow by either transferring momentum from flow region further from the wall passively or actively by direct addition of power drawn from the propulsive system and ducted through the vehicle body or complicated separate systems. Among known separation active control methods, periodic injection of momentum is a very promising tool.

The present invention of active control apparatus offers net periodic momentum addition as well as simultaneous periodic and constant momentum addition, at the optimum frequency or range of frequencies, directions, and amplitudes. In the mode of simultaneous periodic and constant momentum, the relationship between the constant and the periodic momentum can be easily controlled.

Other objects, features, and advantages of the present invention will become apparent upon consideration of the following detailed description and accompanying drawings, in which like reference designations represent like features throughout the FIGURES.

BRIEF DESCRIPTION OF THE DRAWINGS

The drawings referred to in this description should be understood as not being drawn to scale except if specifically noted.

FIGS. 1a and 1b depict a monomorph piezoelectric ceramic stepped actuator employed in the practice of the present invention, with FIG. 1a shown in perspective and FIG. 1b shown in side elevational view;

FIGS. 2a and 2b depict a bimorph piezoelectric ceramic stepped actuator employed in the practice of the present invention, with FIG. 2a shown in perspective and FIG. 2b shown in side elevational view;

FIG. 3, which comprises

FIG. 4a is a side elevational view, depicting the construction of the apparatus resonance cavity for providing output velocity with longitudinal component (velocity component along the slot);

FIG. 4b is an example of a resonance cavity to produce a simultaneous output of constant jet and perturbation jet;

FIG. 5 is a side elevational view, depicting the construction of the apparatus resonance cavity for providing output velocity without longitudinal component;

BEST MODES FOR CARRYING OUT THE INVENTION

Figure 3A:
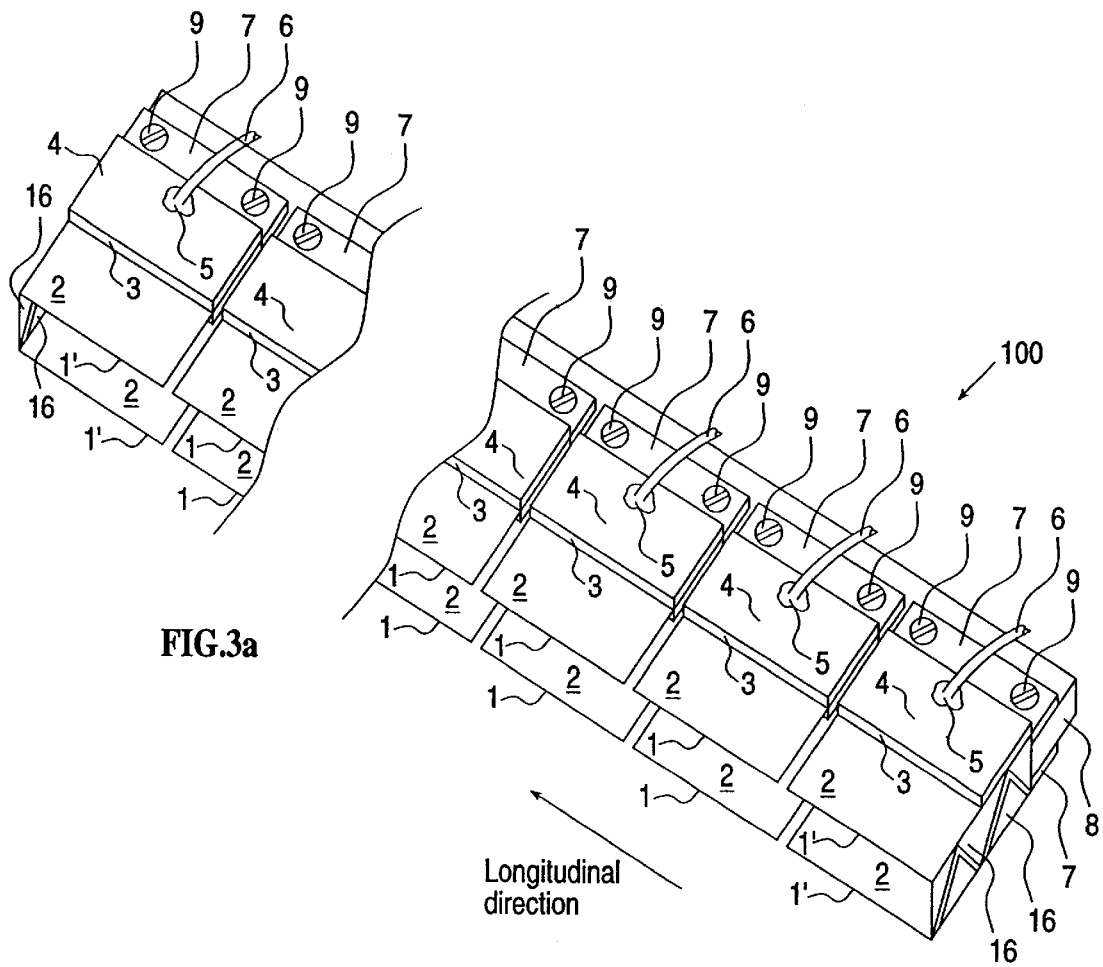
FIGS. 3a and 3b, depicts an example of a parallel array of piezoelectric ceramic stepped actuators, with FIG. 3a shown in perspective view and FIG. 3b shown in end view of an array of monomorph (FIG. 1) or bimorph (FIG. 2) elements.

Reference is now made in detail to a specific embodiment of the present invention, which illustrates the best mode presently contemplated by the inventor for practicing the invention. Alternative embodiments are also briefly described as applicable.

The invention results from the realization that two parallel series of cantilever piezoelectric actuators, with each series having a different range of resonance frequencies tuned to be partially overlapped, enclosed in a resonance cavity which is closed except for the input/output slot, can provide a controllable fluid jet through the slot without net mass flux, i.e., in average, there is zero mass flux through the slot. Each actuator is a stepped cantilever piezoelectric actuator. Referring to FIGS. 1 and 2, the stepped cantilever piezoelectric actuator 1 consists of a thin stainless steel blade 2, which is partially covered along its width with piezoelectric ceramic material 3, for a monomorph working mode (FIG. 1), and sandwiched by two sheets of piezoelectric material 3, 3' for a bimorph working mode (FIG. 2). The cantilevered piezoelectric ceramic actuator 1 is fixed by an adhesive (not shown) to a support plate 7, which can be fastened by bolts 9 (shown in FIG. 3a) or fixed by an adhesive to a holder 8.

A cantilever piezoelectric actuator is utilized as a displacement device in such an above-described mechanism as a piezoelectric fan. Further refinements of this idea are disclosed by Henry H. Kolm et al, "Solid State Blower", U.S. Pat. No. 4,498,851, issued Feb. 12, 1985, and by Yasuo Yamada et al, "Piezoelectric Fan", U.S. Pat. No. 4,498,851, issued Oct. 25, 1988. In these patents, the application is directed to cooling or maintaining stable operating temperature of electronic equipment to prevent overheating, by wind blowing, using a low profile fork- type vibrator having two piezoelectric benders. In these applications, no ducts, walls, or valving are required for the best operation of the device. In fact, the piezoelectric fans operate best in free air, completely unobstructed. In the preferred form, the fan has a housing, which provides only mechanical protection without obstructing the flow. Furthermore, the two piezoelectric benders according to the above-mentioned patents are oscillating at 180 degrees out of phase at the same frequency, which is approximately equal to the piezoelectric benders' resonant frequency. This oscillation is required for the best efficient operation and for balanced operation to further minimize vibration and noise.

Figure 15:
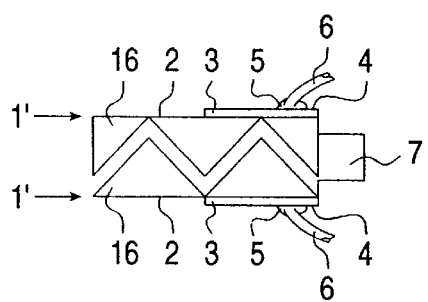
FIG. 15 is a schematic view that illustrates an example to solve the possibility of decaying of the output velocity near the slot corners.

As opposed to the above-mentioned patents, the principle object of the present invention is to provide a controllable zero mass flux jet perturbation through a slot 11 (see, FIGS. 4 and 5 and the discussion associated therewith) for aerodynamic and fluid control, by inducing net momentum into the flow field. In the present invention, high fluid control performance is achieved by choosing, among others, the following: the appropriate materials, the preferred relationship between the materials dimensions, the conductive electrodes, and the preferred resonance cavity shape. The possibility of output velocity decaying near the slot corner can be solved by adding tooth-like walls 16 to the edge actuator 1', such as shown in FIGS. 3 and 15. The edge actuators 1' are the left side and right side actuators in FIG. 3. These tooth-like walls 16 act as a valve. When the two parallel actuators 1' are spread apart, these walls 16 represent low resistance and allow streaming of inlet flow. On the other hand, when the actuators 1' come close to one another, these walls 16 represent high resistance and allow only an outlet velocity through the apparatus slot 11. In this mechanism, there is also no net mass flux because the actuators 1' are enclosed in a closed resonance cavity 10 (FIGS. 4 and 5). This valving method can also be used anywhere along the slot, depending on the operating mode and on the quality needed from the output signal.

The Stepped Cantilever Piezoelectric Actuator

In the present invention, large displacement of the actuator tip 1 is achieved by solving the contacts' junction (the junction between the lead 6 and the piezoelectric material 3) electrical problem. The actuator displacement is magnified significantly due to the actuator contacts' electrode design and production. The electrodes 6 meet the need to solve the electronic rectification in the junction. The contacts 5 are made by using cold welding or silver conducting glue attaching the piezoelectric sheet 3, 3' and coating the entire piezoelectric plate with an electroless silver layer 4. This coating solves the well-known problems of piezoelectric ceramic materials such as electric discharge, which is caused due to appliance of high electric field on piezoelectric ceramic materials. This limitation of applying high electric field on piezoelectric ceramic materials is caused due to inhomogeneity of the piezoelectric plate and the presence of pinholes. The presence of pinholes increases the diffusion rate of tin (from soldering the lead 6 to the piezoelectric material 3) into the piezoelectric materials within changing the material electric parameters, which limits the input electric field and leads to electric breakdown at high electric fields.

The Two Parallel Stepped Piezoelectric Actuators Construction

Figure 3B:
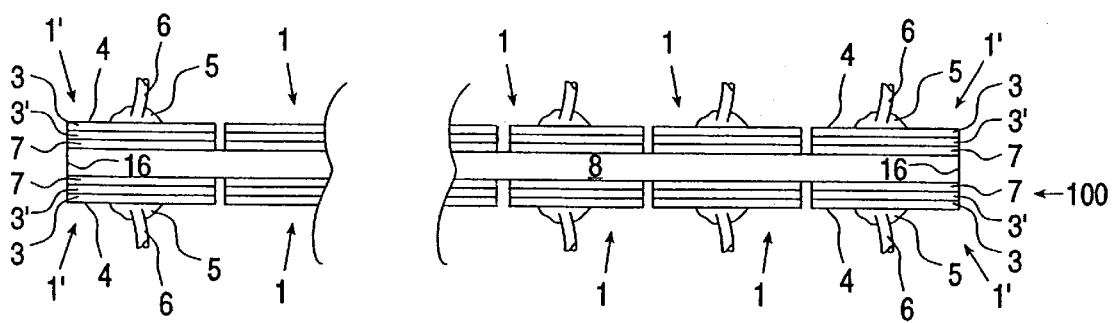
Figure 13:
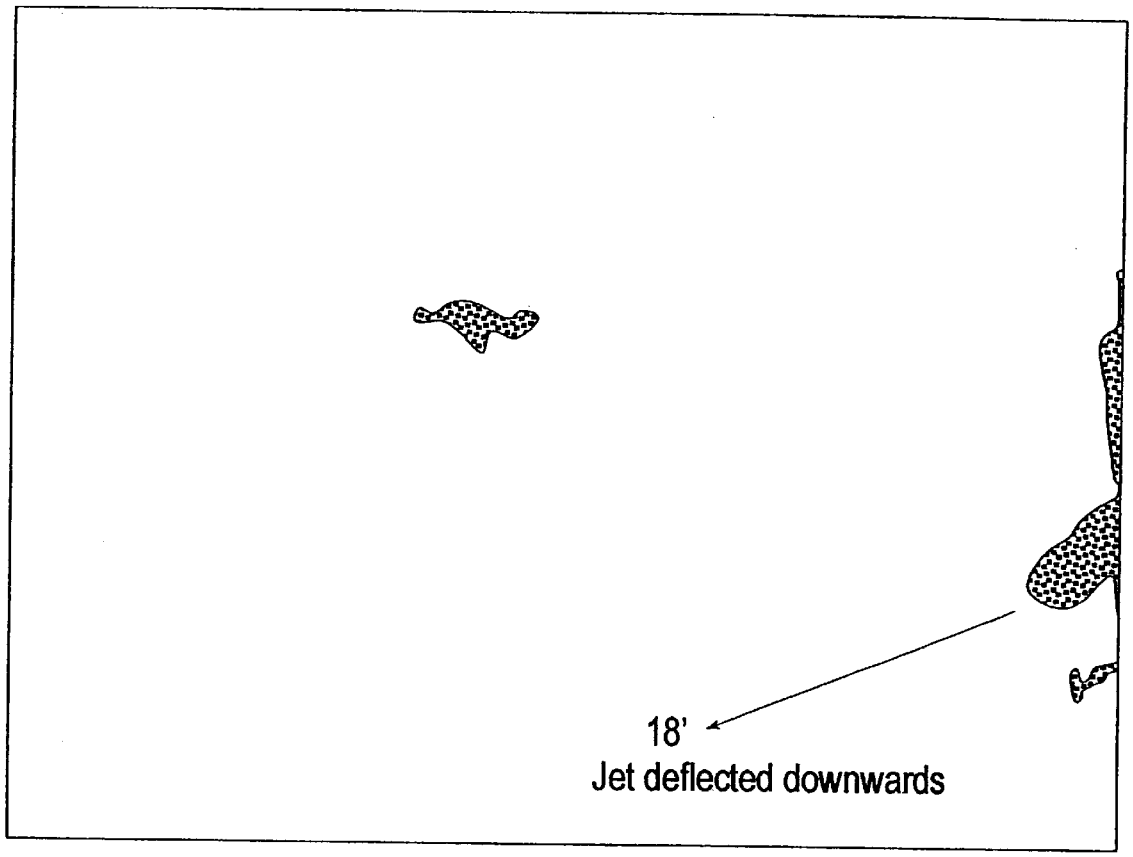
FIG. 13 is a view similar to that of FIG. 12, representing the flow visualization of the apparatus output velocity deflected downwards.
Figure 14:
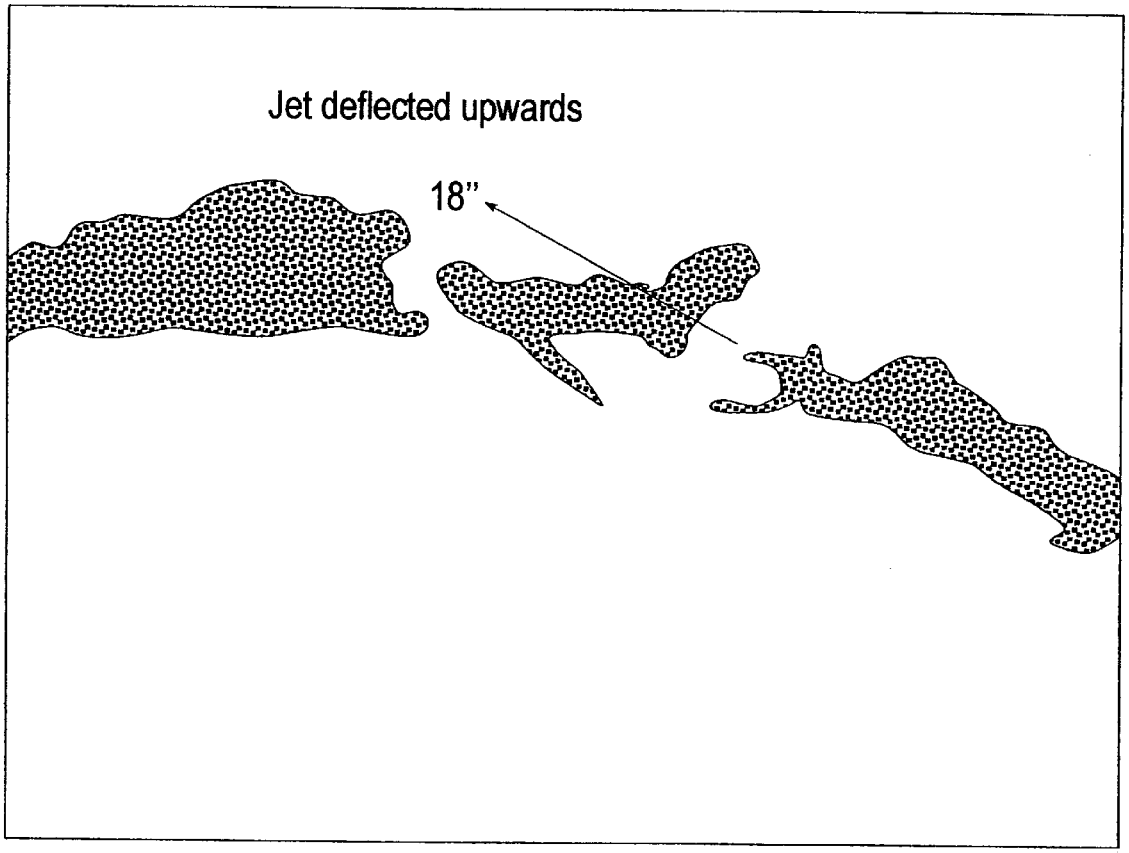
FIG. 14 is a view similar to that of FIG. 12, representing the flow visualization of the apparatus output velocity deflected upwards.

Referring now to FIGS. 3a and 3b, the design of two parallel series 100 of piezoelectric actuators 1, which are housed in a resonance cavity 10 (not shown in FIGS. 3a or 3b), allows an unlimited length of zero mass flux jet output to meet the need of aerodynamic wings, bodies, and helicopter rotating blades. The controllability of the jet direction is achieved by using different limits of the resonance frequencies in a range around the main resonance frequency for each actuator series, whereas the ranges of the two resonance frequencies chosen partly overlap. When activating the actuators 1 by an input electric periodic signal at the main resonance frequency of one actuator series, the other series will be far from its main resonance frequency but it will still vibrate. The output jet will be deflected from the perpendicular direction sweeping the common frequencies range (i.e., from the lower limit of one series to the upper limit of the second series) and will provide a deflected jet at various directions downward as shown in FIG. 13 and upward as shown in FIG. 14. Furthermore, the deflected jet can be achieved, for example, by using different lengths of the actuators 1 in each series of the two parallel series arrays 100 or by feeding non-identical input signals to the actuator series. The input signal can vary, for example, by phase lag amplitude or frequency. Variation of the excitation level at a given input leads to variation in the response output jet in one or a few parameters simultaneously, for example, the jet amplitude and the direction. A significant advantage of the present invention is the longitudinal modulation feature (modulation along the direction of the slot 11). The width of the apparatus actuators can be designed to match the custom needs of the required resolution and the number of longitudinal wavelengths needed in the longitudinal direction. By using small width actuators and feeding the appropriate input voltage, an unlimited longitudinal modulation of frequency, amplitude and direction can be achieved.

The Resonance Cavity

Figure 10:
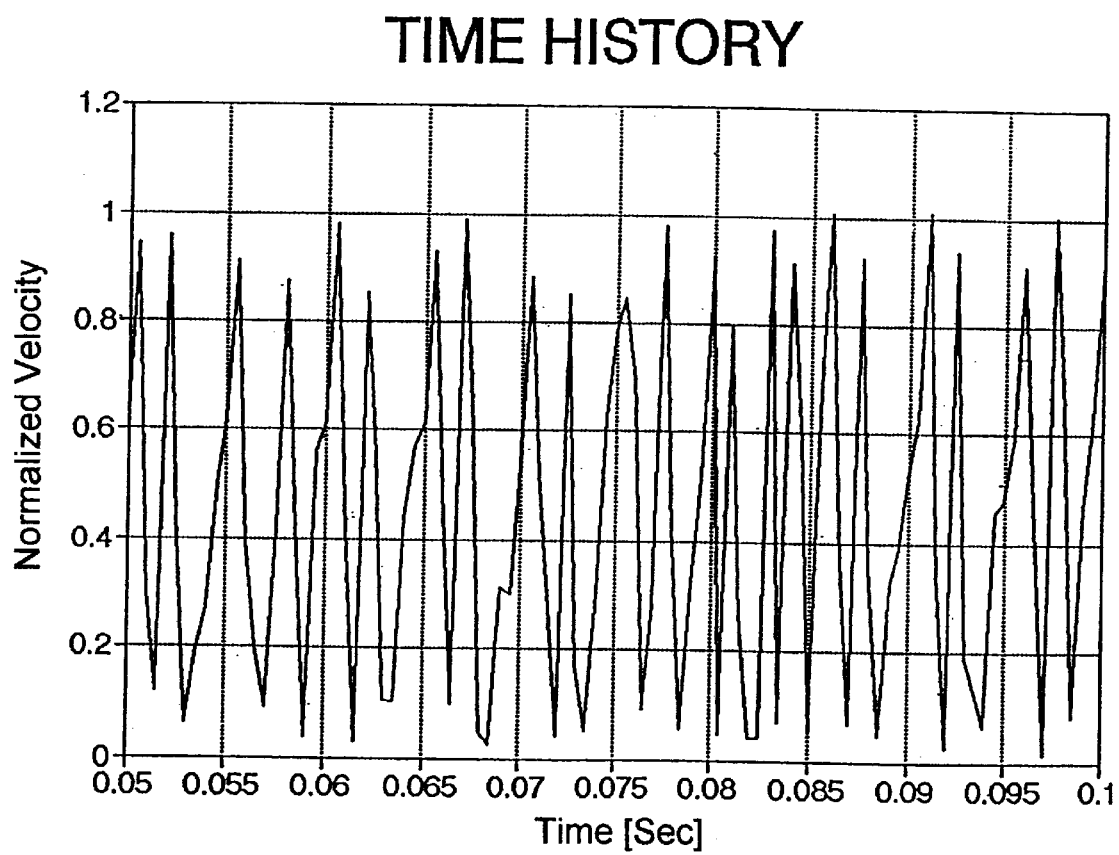
FIG. 10, on coordinates of velocity (normalized) and time (in seconds), is a plot that illustrates the hot wire anemometry recorded output velocity taken at the center of the 2-D apparatus output slot for the resonance cavity as illustrated at FIG. 5.

Referring now to FIGS. 4 and 5, the resonance cavity 10 controls the amplitude, the frequency, and the velocity components content of the output jet. If the design of the resonance cavity 10 is chosen so that the vibrating tips of the actuators 1 are very close to the slot section 11, such as shown in FIG. 5, then the output frequency spectra contains the main frequency and its higher harmonic, as shown by hot-wire anemometry measurements (see FIGS. 10 and 11 and the discussion associated therewith). The first high harmonic is of the same level of the main frequency. It means that the signal is rectified and there is no velocity component along the slot 11.

Figure 8:
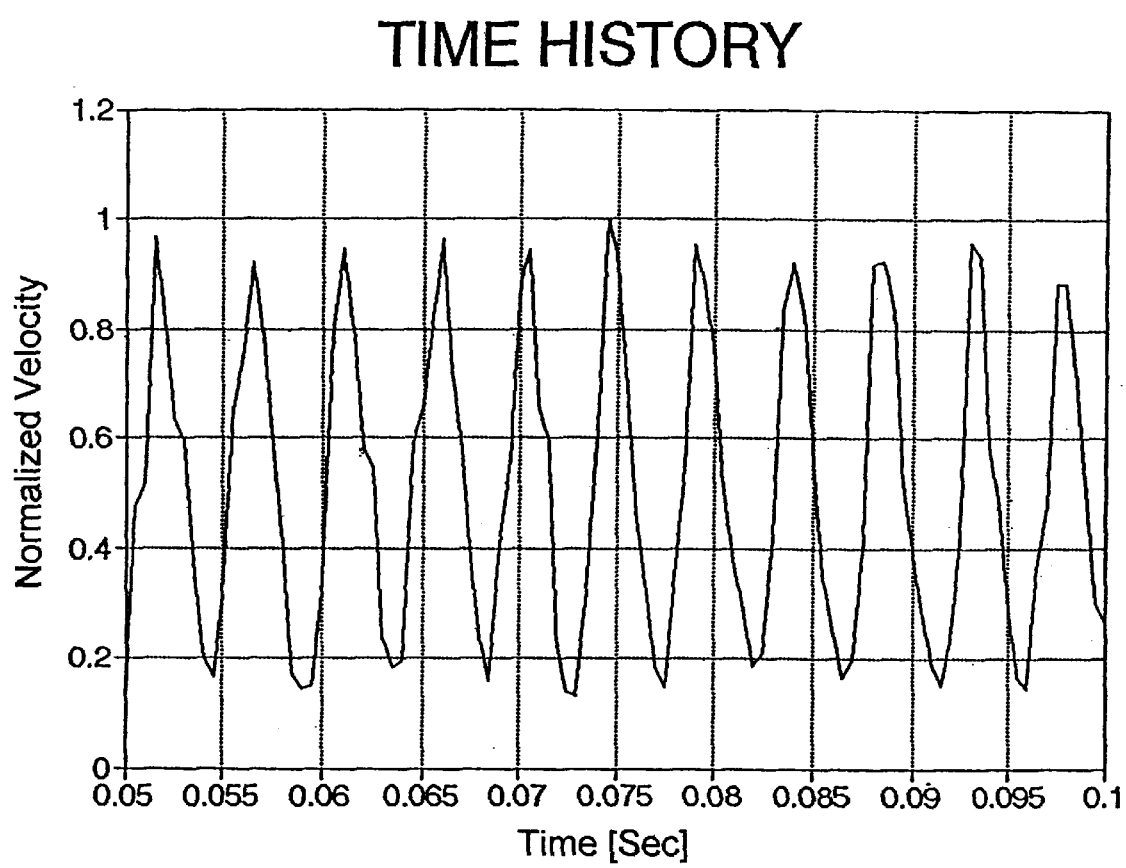
FIG. 8, on coordinates of velocity (normalized) and time (in seconds), is a plot that illustrates the hot wire anemometry recorded output velocity taken at the center of the 2-D apparatus output slot for the resonance cavity as illustrated at FIG. 4.
Figure 9:
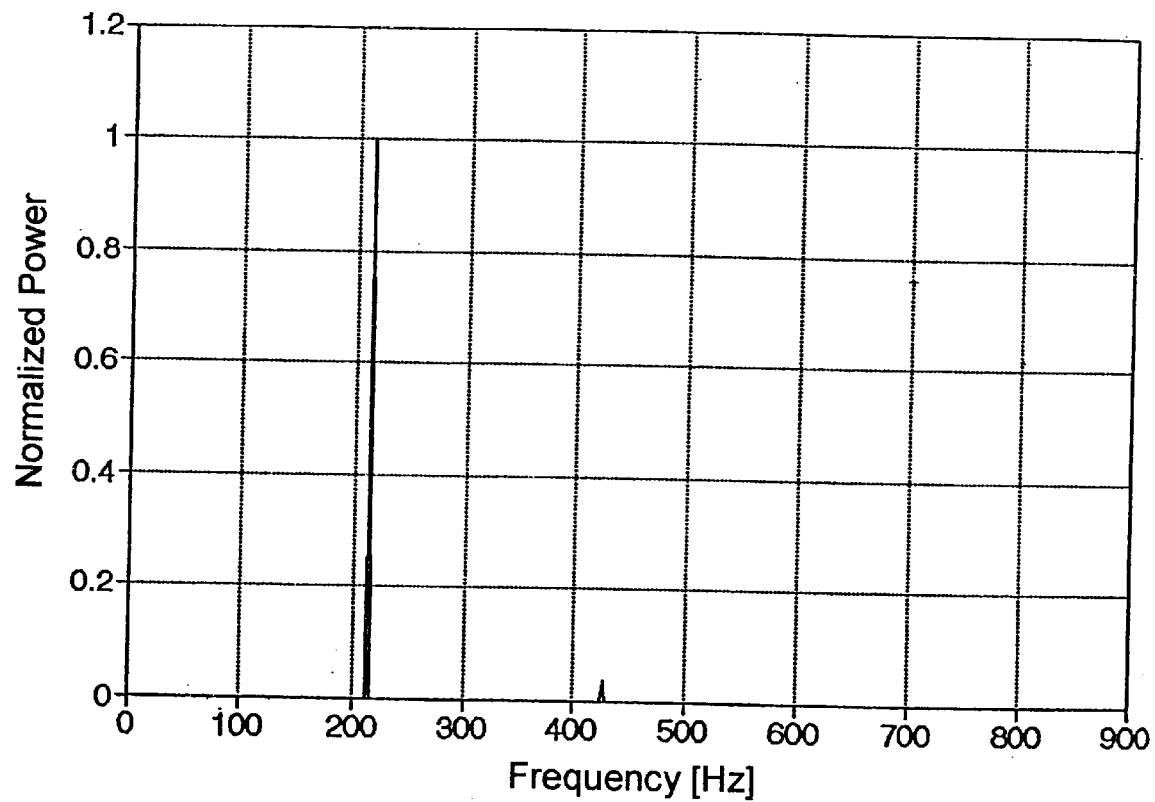
FIG. 9, on coordinates of power (normalized) and frequency (in Hertz), is a plot that illustrates the frequency content of the signal illustrated by FIG. 8.

Using the resonance cavity 10 in which the actuators 1 are located far from the slot section 11, as shown in FIG. 4, results in output frequency spectra that contains only the main frequency (see FIGS. 8 and 9 and the discussion associated therewith). This means that the hot wire anemometry signal is not rectified and there is a longitudinal velocity component (i.e., along the jet slot 11). This output produces a pseudo-constant flow, although there is no net mass flux. This output meets the requirements for fluid control by adding the constant momentum accomplished by oscillating momentum.

As used herein, the phrase "close to the slot" means that the distance between the actuator tip and the slot is about 10% of the distance between the two actuator series. The phrase "far from the slot" means that the distance between the actuator tip and the slot is higher than the distance between the two actuator series.

In addition to the single slot 11 shown in FIGS. 4 and 5, it is possible to add an input slot or hole to the resonance cavity 10 of the present invention. In this alternate operating mode, the apparatus is able to produce a constant mass flux in addition to the zero mass flux perturbation.

Figure 6:
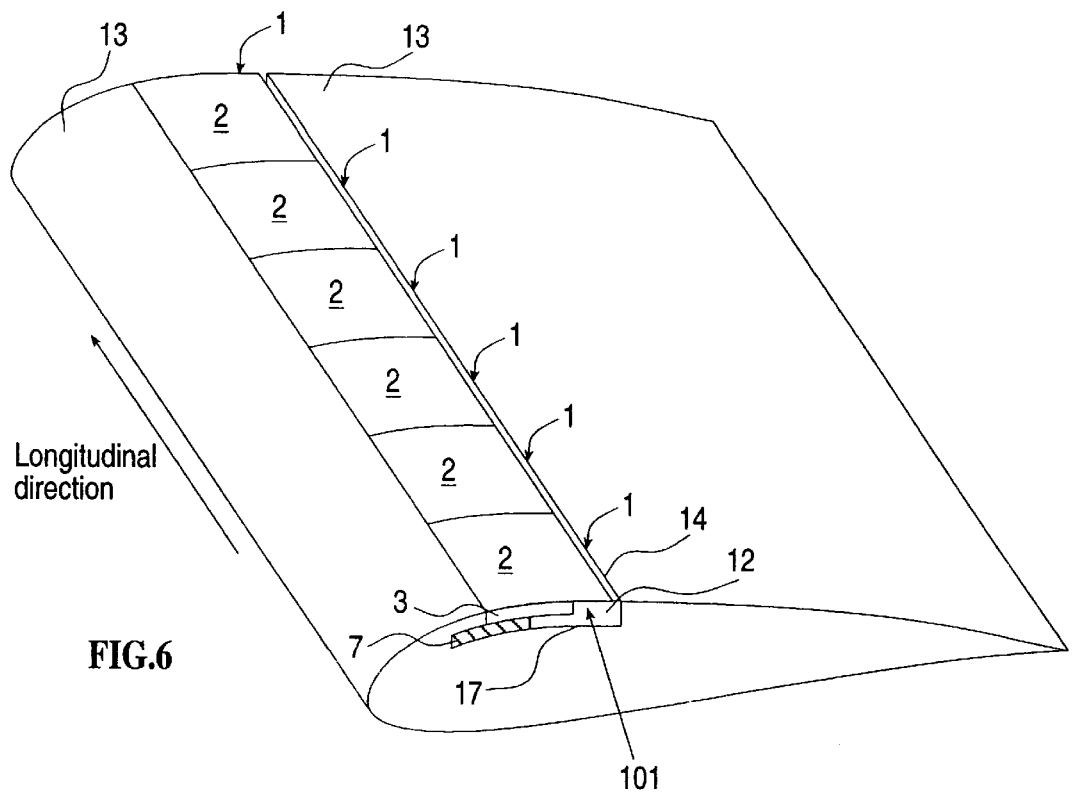
FIG. 6 is a side elevational view, depicting a portion of the apparatus for boundary layer excitation with longitudinal modulation and simultaneous mechanical and fluidic jet perturbation mounted on a wing skin.
Figure 7:
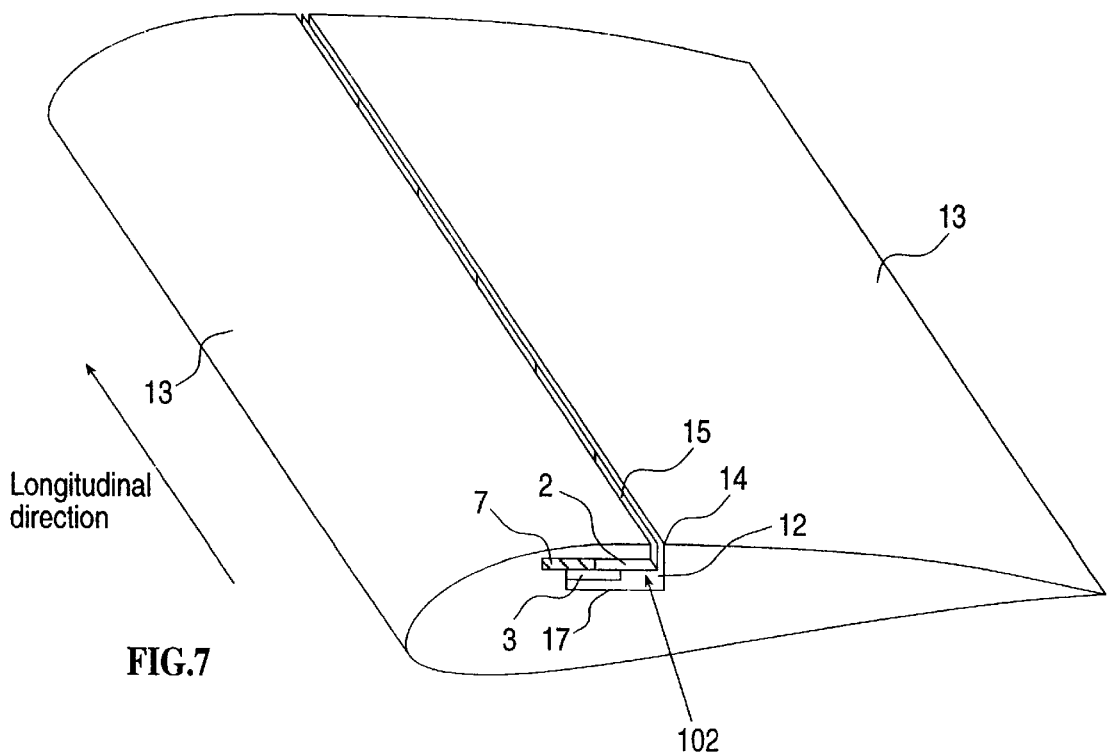
FIG. 7 is a side elevational view of another example of boundary layer excitation array of actuators with a bent blade located under the body skin of a wing.

In another embodiment of the present invention, referring now to FIGS. 6 and 7, the boundary layer can be excited by using the previously-described modified, stepped piezoelectric actuators 1, monomorph as well as bimorph, mounted as one series 101 or 102 to the surface 13. This configuration is suitable for exciting a boundary layer upon a rigid surface 13, and meets the need of low volume aerodynamic bodies allowing longitudinal modulation. The series 101 of actuators 1 can be mounted, for example, upon a channel 17 in the aerodynamic surface 13, as shown in FIG. 6. The actuators 1 compress the cavity air 12 between the actuator and the surface 13 when moving downwards, resulting in a common interference of the flow, with simultaneous longitudinal controlled perturbations of mechanical and fluidic jets 14, 15.

Both FIGS. 6 and 7 represent excitation of the boundary layer near the surface skin, with FIG. 6 depicting on the skin and FIG. 7 depicting under the skin. The apparatus 101 of FIG. 6 produces jets, while the apparatus 102 of FIG. 7 produces jets plus mechanical perturbation. It will be appreciated by those skilled in this art that the placement of the actuators 1 near the skin surface 13 depicted in FIGS. 6 and 7 is exemplary only, and that other configurations may be employed in accordance with the teachings herein.

Test Data

The experimental data illustrated in FIGS. 8–11 shows that the frequency content of the apparatus output can be controlled. Specifically, FIG. 9 shows that the frequency spectra contain only the main frequency, as a result of the pseudo-constant velocity component. This is an outcome due to presence of the longitudinal component. The same conclusion is deductible from FIG. 8, which is the behavior of the output jet in time in the resonance cavity depicted in FIG. 4a. The data for FIGS. 8 and 9 were derived from the embodiment depicted in FIG. 4a.

Figure 11:
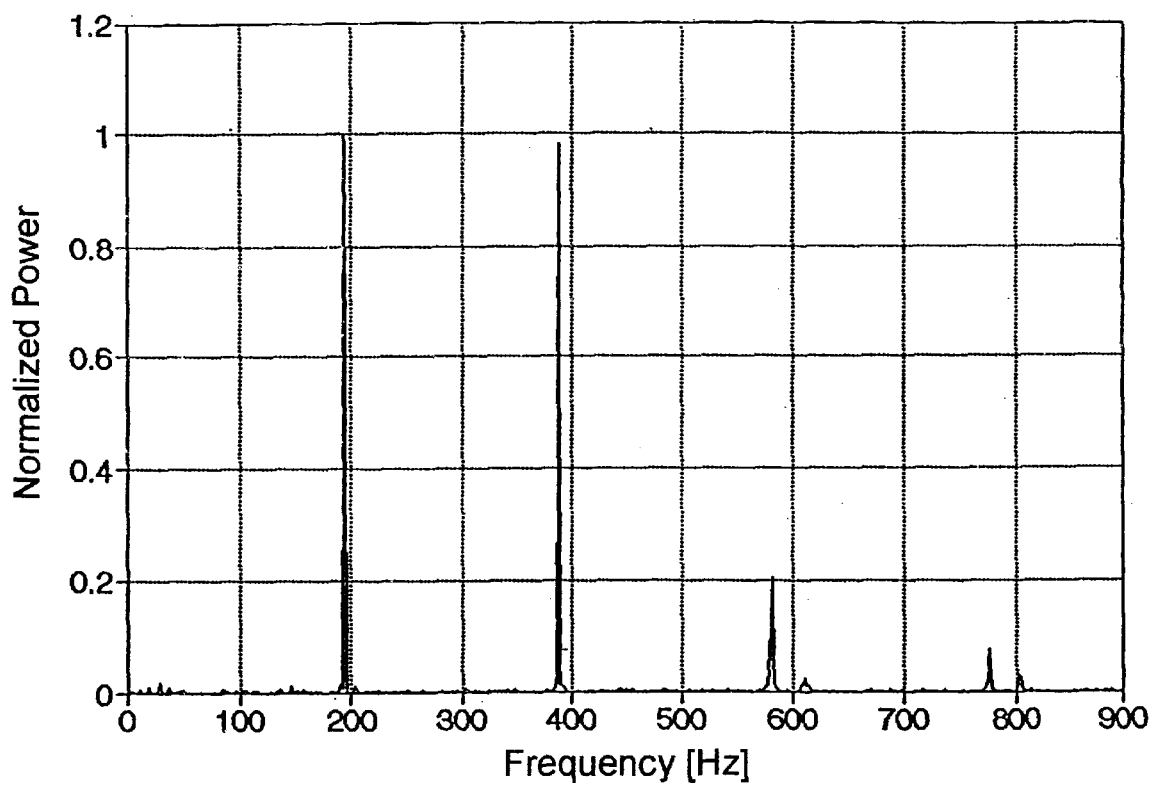
FIG. 11, on coordinates of power (normalized) and frequency (in Hertz), is a plot that illustrates the frequency content of the signal illustrated by FIG. 10.

FIG. 11 shows that the frequency spectra contain the main frequency and the first harmonic, as a result of the fully rectified signal. This output does not contain any longitudinal velocity component. The data for FIGS. 10 and 11 were derived from the embodiment depicted in FIG. 5.

The results shown in FIGS. 8–11 were derived from an input voltage of 100 $V_{rms}$, a slot length of 80 mm and a slot width of 5 mm. One can divide the apparatus length into sections and activate each section in individual input to produce the 3-D mode. One example is the flow visualization depicted in FIGS. 12–14.

Flow Visualization

Figure 12:
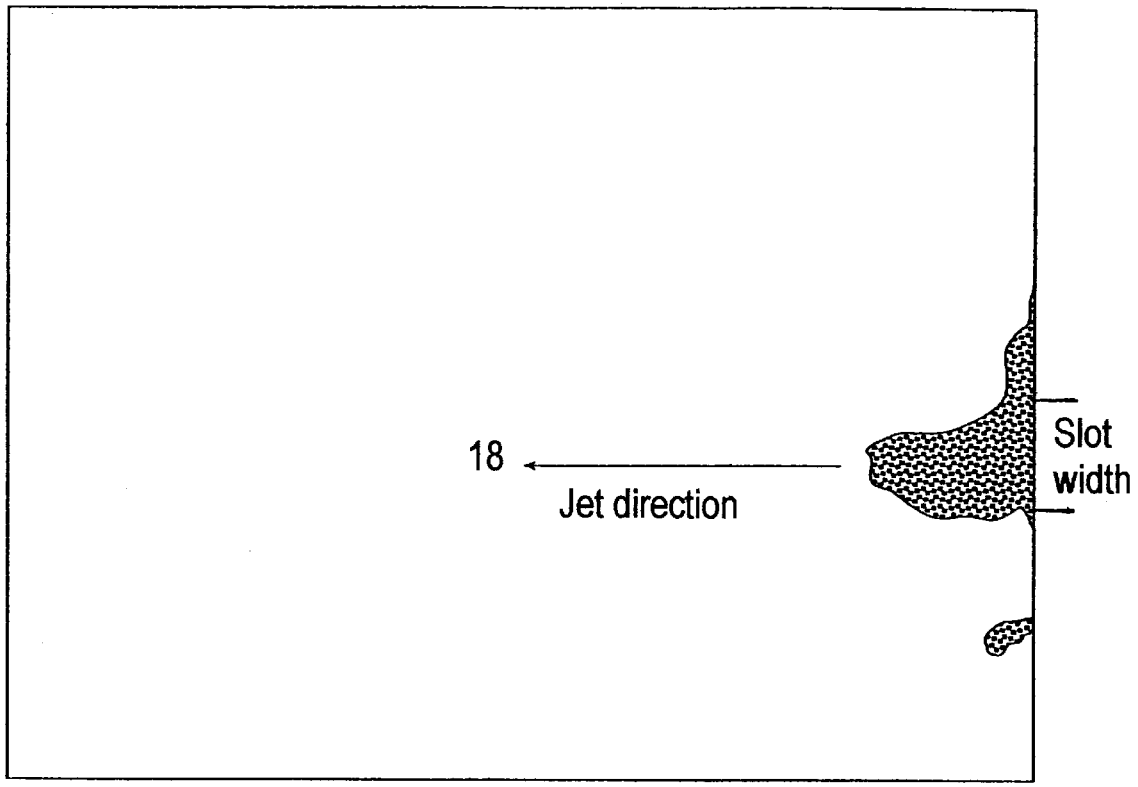
FIG. 12 is a line drawing of a photograph of the flow visualization of the apparatus output of perpendicular velocity.

The flow through the apparatus output slot 11 described in FIG. 4 was photographed when the two actuators series were activated at the same frequency and amplitude, resulting in a perpendicular output jet 18, shown in FIG. 12. When the frequency was changed by 5% upward, the jet 18' deflected downwards, as shown in FIG. 13. When the frequency was changed by 5% downward, the jet 18" deflected upwards, as shown in FIG. 14.

Application to a Wing

Figure 16:
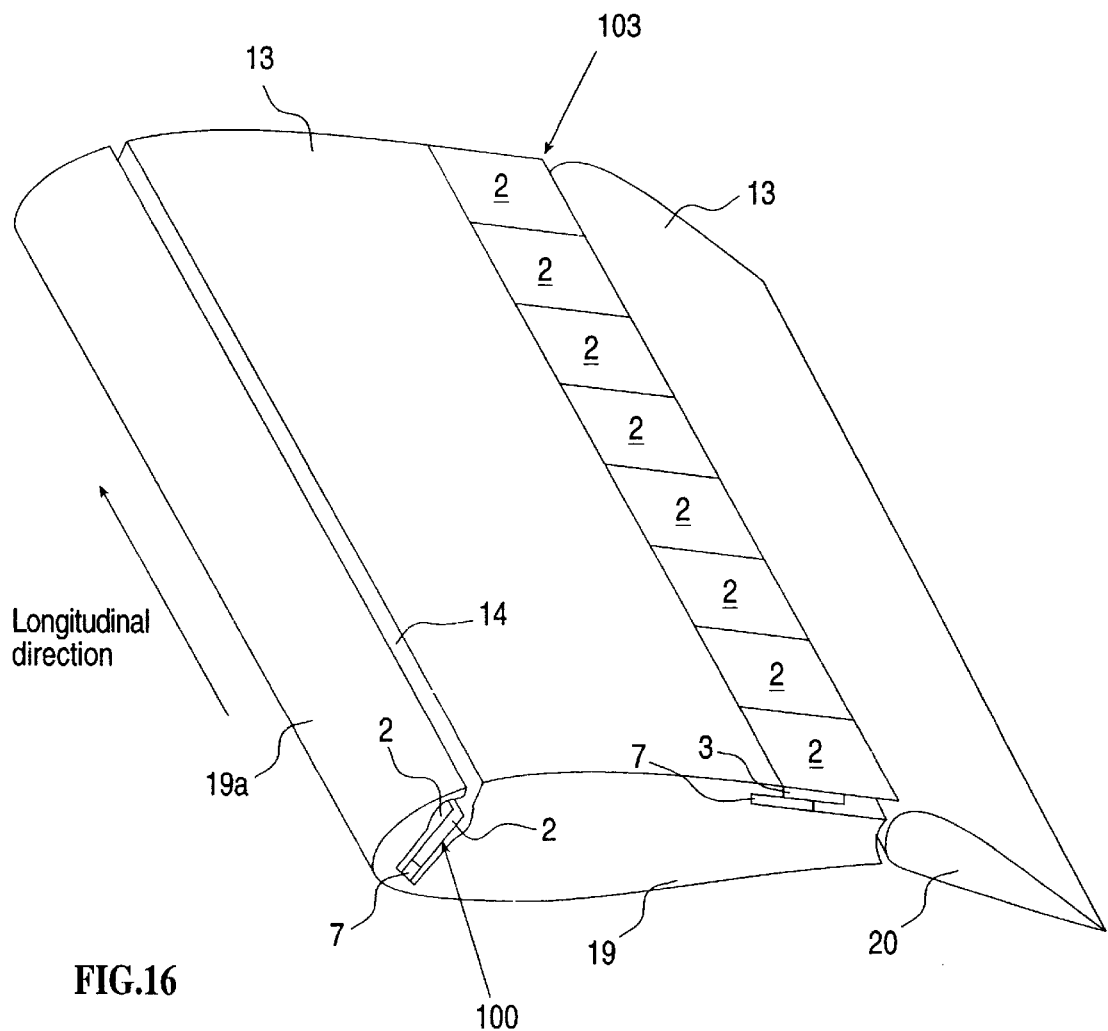
FIG. 16 illustrates a wing constructed in accordance with the present invention in order to increase the lift of the wing.

FIG. 16 illustrates a wing 19 having two perturbation-producing arrays 100, 103 of the present invention. The perturbation-producing arrays 100, 103 in FIG. 16 are used for the prevention or alleviation of boundary layer separation precipitated by the severe adverse pressure gradients which occur on the highly curved regions of the upper surface at the wing nose 19a and the flap knee 20.

The first perturbation-producing array 100 is located in the vicinity of the leading edge 19a of the wing airfoil 19. This demonstrates an example of one possible perturbation-producing array 100 with a resonance cavity which produces a zero mass flux controllable jet through a slot in the vicinity of the wing's leading edge 19a.

The second perturbation-producing array 103 is located on the flap knee 20. This demonstrates an example of an array which is surface-mounted and is being used to excite the turbulent boundary layer where the actuators interact directly with the boundary layer.

Most airplanes use blowing of high speed jets over a deflected flap. It enables the airplane to land at a lower speed, but it requires a prohibitively large momentum. The complexity of such a system and its large power consumption greatly limits its application.

The apparatus 103 illustrated in FIG. 16 over the flap knee 20 offers the 2-D or 3-D periodic injection of momentum without the concomitant addition of mass flux. Further, the apparatus 103 delays the separation over the flap much more effectively than the prior art approach described in the previous paragraph.

Both of the examples depicted in FIG. 16 can be easily operated in the 2-D or 3-D mode to provide an alternating pattern of stream-wise vortices. It will be appreciated by those skilled in this art that the placement of the actuators 1 in tandem in the leading edge 19a and on the flap knee 20 depicted in FIG. 16 is exemplary only, and that other configurations may be employed in accordance with the teachings herein.

The excitation and the interaction enhance the large transverse eddy structures near and downstream of the separation point, which amplifies the mixing in the shear layer bounding the separate flow region. This increases entrainment and reduces the extent of separation. This permits increasing the wing angle of attack and thereby the lift without stall.

INDUSTRIAL APPLICABILITY

An apparatus for active fluid control has been described, for use in controlling the separation of a boundary layer in a fluid stream flowing over a solid surface, such as a wing.

Thus, there has been disclosed apparatus for active fluid control. It will be readily apparent to those skilled in this art that various changes and modifications of an obvious nature may be made, and all such changes and modifications are considered to fall within the scope of the present invention, as defined by the appended claims.

What is claimed is:

1. An active apparatus for producing and generating controlled fluidic perturbations to be induced in a boundary layer flow and in a fluid stream for controlling and changing characteristics of boundary layer separation and flow characteristics in bounded and unbounded flow fields, said active apparatus including (a) at least one stepped cantilever piezoelectric actuator comprising a vibrating tip and secured to a support plate, said at least one stepped cantilever piezoelectric actuator having a resonance frequency, and (b) activating means for causing said vibrating tip to periodically vibrate around its steady state position without any stable position when activated at or near said resonance frequency.

2. The apparatus of claim 1 for increasing the maximum angle of attack of aerodynamic bodies and the mixing rate of fluid mixing process.

3. The apparatus of claim 1 for control of frequency, amplitude, phase and direction.

4. The apparatus of claim 3 contained in a resonance cavity.

5. The apparatus of claim 3 wherein said control of frequency at the perturbation jet frequency can be electrically controlled in the 2-D or 3-D (longitudinal direction) mean.

6. The apparatus of claim 3 wherein said control of amplitude can be electrically controlled in the 2-D or 3-D (longitudinal direction) mean.

7. The apparatus of claim 3 wherein said control of phase at the perturbation jet phase lag can be electrically controlled in the 2-D or 3-D (longitudinal direction) mean.

8. The apparatus of claim 3 wherein said control of direction at the perturbation jet emanating from the nozzle can be electrically controlled in the 2-D or 3-D (longitudinal and perpendicular) mean.

9. The apparatus of claim 3 wherein said packed in a resonance cavity at which the apparatus packed and determine the initial and the basic features.

10. The apparatus of claim 3 having an unlimited output length.

11. The apparatus of claim 3 wherein the flow field to be controlled includes a plurality of perturbation jets in tandem.

12. The apparatus of claim 1 wherein the output of the apparatus produces a constant momentum and a selecting momentum.

13. An active apparatus for producing and generating a momentum and/or controlled fluidic signal and/or perturbation to be induced in a boundary layer flow and/or in a fluid field or flow stream for controlling and enhancing the flow field momentum for delaying boundary layer separation and modify flow characteristics in bounded and unbounded flow fields, said apparatus comprising:
    (a) a resonance cavity having an exit slot;
    (b) at least one stepped cantilever piezoelectric actuator comprising a vibrating tip and secured to a support plate in said resonance cavity, each said stepped cantilever piezoelectric actuator having a resonance frequency;
    (c) said resonance cavity tuned to a frequency range of the resonance frequencies of said at least one stepped cantilever piezoelectric actuator, which allows an unlimited length of zero mass flux jet output; and
    (d) activating means for causing said vibrating tip to periodically vibrate at or near its resonance frequency,
thereby providing a controllable momentum and zero mass flux perturbation through said exit slot.

14. The apparatus of claim 13 wherein said at least one piezoelectric actuator comprises a comparatively thin metal blade, which forms said vibrating tip, partially covered along one major surface with a comparatively thick piezoelectric ceramic material to form a monomorph device.

15. The apparatus of claim 13 wherein said at least one piezoelectric actuator comprises a comparatively thin metal blade, which forms said vibrating tip, partially sandwiched between two layers of comparatively thick piezoelectric material to form a bimorph device.

16. The apparatus of claim 13 comprising two parallel series of said cantilever piezoelectric actuators, each series comprising at least one said cantilever piezoelectric actuators.

17. The apparatus of claim 16 wherein said vibrating tips of said piezoelectric actuators are located close to said exit slot.

18. The apparatus of claim 16 wherein said vibrating tips of said piezoelectric actuators are located far from said exit slot.

19. The apparatus of claim 13 wherein said at least one piezoelectric actuator is mounted in a channel in an aerodynamic surface.

20. The apparatus of claim 13 comprising a plurality of piezoelectric actuators, arranged in a side-by-side fashion.

21. The apparatus of claim 20, with selected actuators provided with tooth-like walls which act like a valve.

22. The apparatus of claim 21, wherein end actuators are provided with said tooth-like walls.

23. The apparatus of claim 13 provided with an input slot into said resonance cavity, whereby said apparatus produces a constant mass flux.

24. An active apparatus for producing and generating a momentum and/or controlled fluidic signal and/or perturbation to be induced in a boundary layer flow and/or in a fluid field or flow stream for controlling and enhancing the flow field momentum for delaying boundary layer separation and modify flow characteristics in bounded and unbounded flow fields, said apparatus comprising:
    (a) a resonance cavity having an exit slot;
    (b) at least one stepped cantilever piezoelectric actuator comprising a vibrating tip and secured to a support plate in said resonance cavity, each said stepped cantilever piezoelectric actuator having a resonance frequency;
    (c) said resonance cavity tuned to a frequency range of the resonance frequencies of said at least one stepped cantilever piezoelectric actuator, which allows an unlimited length of zero mass flux jet output;
    (d) activating means for causing said vibrating tip to periodically vibrate at or near its resonance frequency;
    (e) each stepped cantilever piezoelectric actuator having an individual input for electrical activation by said activating means; and
    (f) an adjustable distance from said at least one stepped cantilever piezoelectric actuator to said output slot,
thereby providing a controllable momentum and zero mass flux perturbation through said exit slot.

* * * * *